US007576633B2

(12) United States Patent
McGunn et al.

(10) Patent No.: US 7,576,633 B2
(45) **Date of Patent: *Aug. 18, 2009**

(54) METHOD AND APPARATUS FOR CONTROLLING A SAFE HAVING AN ELECTRONIC LOCK

(75) Inventors: Edward J. McGunn, Chicago, IL (US); James Ivey, III, Posen, IL (US); Gregory Grzegorz Dylewski, Chicago, IL (US); Eduardo DeCastro Barcellos, Posen, IL (US)

(73) Assignee: Corporate Safe Specialists, Inc., Posen, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 11/072,922

(22) Filed: Mar. 3, 2005

(65) Prior Publication Data

US 2005/0144996 A1 Jul. 7, 2005

(51) Int. Cl.
*B60R 25/00* (2006.01)

(52) U.S. Cl. ....................... 340/5.73; 340/5.1; 340/542; 340/541; 340/540; 340/5.2; 340/5.5

(58) Field of Classification Search .................. 340/5.6, 340/5.64, 5.25, 5.33, 5.61, 5.5, 5.54, 521, 340/505, 5.73, 5.2, 5.1, 542, 541, 540; 70/278.2, 70/268, 267, 271; 713/177; 463/16; 705/40, 705/43, 44
See application file for complete search history.

(56) References Cited

U.S. PATENT DOCUMENTS 3,979,932 A 9/1976 Piche
4,325,239 A 4/1982 Larson
4,649,723 A 3/1987 Appelbaum
4,914,732 A 4/1990 Henderson et al.
5,349,345 A 9/1994 Vanderschel
5,410,301 A * 4/1995 Dawson et al. ............. 340/5.33
5,523,746 A * 6/1996 Gallagher .................. 340/5.61
5,725,081 A 3/1998 Meeker
5,742,034 A 4/1998 Meeker
5,774,058 A * 6/1998 Henry et al. ................. 340/5.5
5,813,510 A 9/1998 Rademacher
5,815,557 A * 9/1998 Larson ...................... 340/5.64
6,040,771 A 3/2000 Kim
6,067,530 A 5/2000 Brooks et al.
6,724,303 B2 4/2004 McGunn et al.
6,882,269 B2 * 4/2005 Moreno ..................... 340/5.73
6,885,281 B2 4/2005 McGunn et al.
7,063,252 B2 6/2006 Smith et al.

* cited by examiner

*Primary Examiner*—Vernal U Brown
(74) *Attorney, Agent, or Firm*—Wood, Phillips, Katz, Clark & Mortimer

(57) ABSTRACT

A control unit to control an electronic lock on a safe includes an electronic lock for the safe. The electronic lock receives signals from an external computer, and controls the safe in response to the signals.

20 Claims, 8 Drawing Sheets

METHOD AND APPARATUS FOR CONTROLLING A SAFE HAVING AN ELECTRONIC LOCK

FIELD OF THE INVENTION

This invention generally relates to electronic locks, and more particularly to a method and apparatus for controlling a safe having an electronic lock.

BACKGROUND OF THE INVENTION

Throughout history, people have developed locks and/or safes to protect currency or other valuable items. As electronics continued to advance, electronic locks were developed. Such electronic locks made the use of locks and safes more convenient. However, as the method of doing business of various stores and businesses has changed, the need for locks, including some electronic locks, has changed. In particular, while locks may prevent criminals from stealing currency, such locks do not prevent accounting errors or the theft of currency by individuals who have access to the safes. That is, once a conventional safe is open, transactions related to the contents of the safe are not recorded. As more stores have extended hours, including 24 hour stores, more employees have access to a store's currency. Similarly, as more stores continue to grow and add chains or franchises, these stores have a greater amount of currency and a larger number of locations to monitor.

Accordingly, there is a need for a method and apparatus for controlling a safe having an electronic lock. There is a further need for maintaining a database of activity related to an electronic lock.

SUMMARY OF THE INVENTION

The present invention according to one embodiment relates to a method of using an external control unit to control a lock on a safe. The method comprises the steps of providing an electronic lock for the safe, receiving signals at the electronic lock from the external control unit, and controlling the safe in response to the signals.

According to another embodiment, a method of using a control unit to control a lock on a safe comprises the steps of receiving login information at the control unit, enabling a user to select an open door option, and providing signals from the control unit to the electronic lock in response to the selection of the open door option.

According to another embodiment, an apparatus for controlling a lock on a safe comprises an electronic lock incorporated in a safe, an input/output port coupled to the electronic lock for receiving signals from a control unit, and an unlock signal received at the input/output port for opening the safe.

According to a further embodiment, a system for controlling a lock on a safe comprises an electronic lock coupled to a safe, an input/output port coupled to the electronic lock; a computer coupled to the input/output port, and an unlock signal received at the input/output port from the computer for opening the safe is disclosed.

It is an object of the invention is to control a safe having an electronic lock by a control unit.

It is a further object of the invention to unlock a safe having an electronic lock by way of a computer.

It is a further object of the invention to control a safe having an electronic lock by way of an authorized user at a remote location.

It is a further object of the invention to provide an audit data base of activity of an electronic lock on a safe.

It is a further object of the invention to provide a change dispenser to enable the receipt of change without having to open a safe.

Other objects and advantages will become apparent from the following specification taken in connection with the accompanying drawings.

DESCRIPTION OF THE PREFERRED EMBODIMENTS

Figure 1:
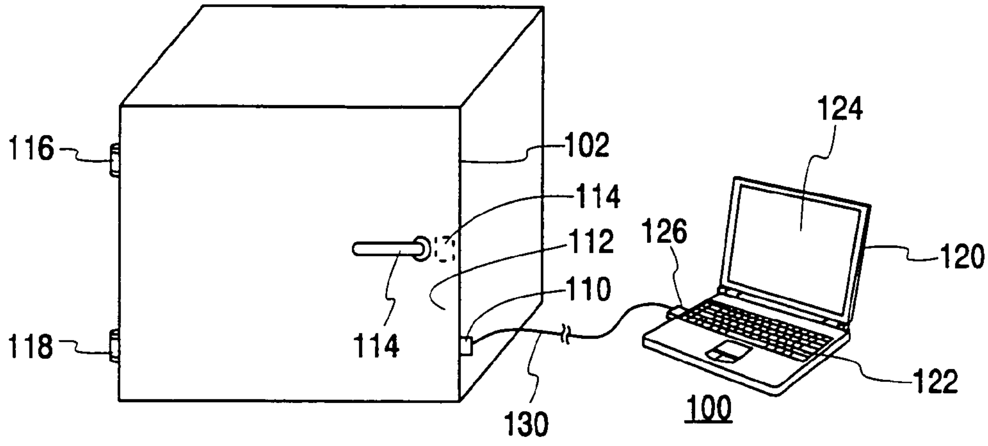
FIG. 1 is a perspective view of a safe having an electronic lock coupled to a control unit according to the present invention.

Turning now to FIG. 1, a perspective view shows a safe having an electronic lock which is coupled to a control unit. In particular, an electronic locking system 100 comprises a safe 102 having an electronic lock 104, shown in detail in FIG. 3 within the safe. The safe 102 further includes an input/output port 110 coupled to the electronic lock 104. Finally, the safe 102 includes a door 112, a handle 114, and hinges 116 and 118. Although a single door is shown, it will be understood that the safe could include a plurality of doors, as is well known in the art.

The electronic locking system 100 further includes a control unit 120 preferably having a keypad 122 and a display 124. The control unit 120 further includes an input/output port 126 for communicating with the electronic lock 104 by way of a communication link 130. The control unit 120 could be any conventional computer or other communication device. The control unit 120 could be remotely located and communicate with the electronic lock 104 by any known protocol, such as RS-232, or some proprietary protocol, over a wireline or wireless interface or network.

Figure 2:
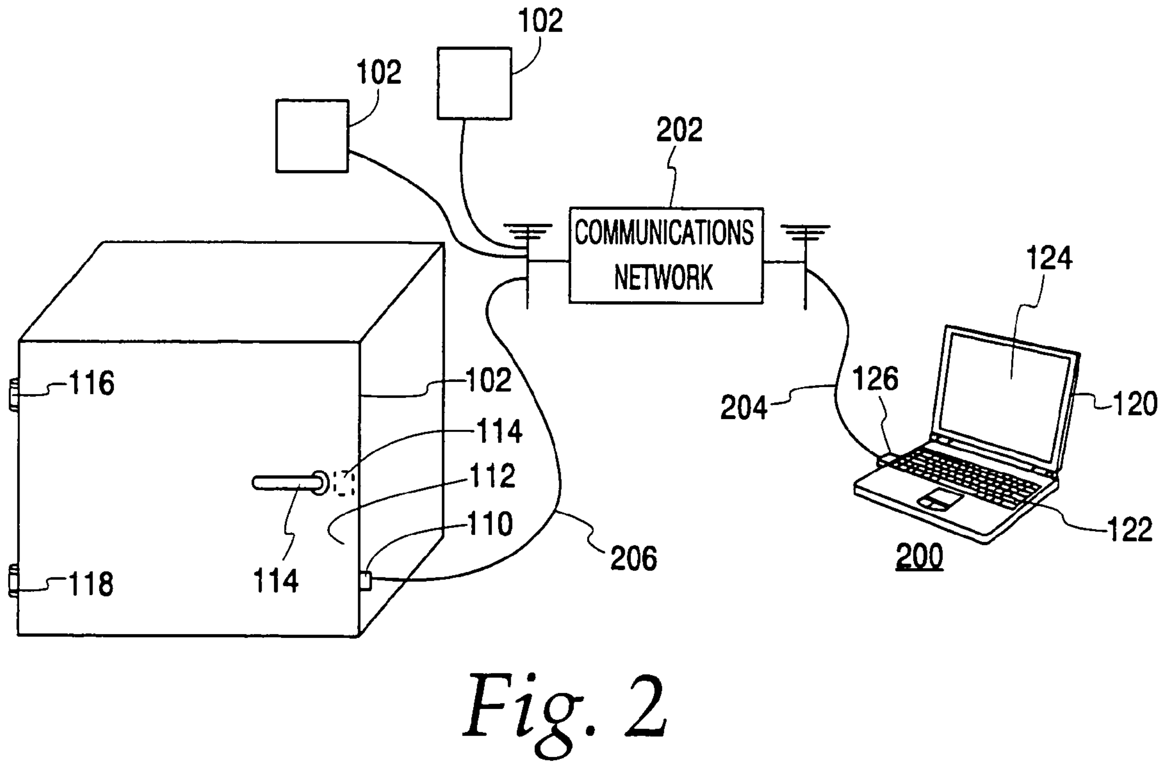
FIG. 2 is a perspective view of a safe having an electronic lock coupled to a control unit by way of a telecommunications network according to the present invention.

Turning now to FIG. 2, a perspective view shows a safe having an electronic lock 104 adapted to communicate with a control unit by way of a communications network. In particular, electronic locking system 200 comprises a communications network 202 having a communication link 204 coupled to the control unit 120, and a communication link 206 coupled to the electronic lock 104 of the safe 102. As can be seen in FIG. 2, the control unit 120 is coupled to a plurality of safes 102 by way of the communications network 202. Although the safes 102 are shown connected directly to the communications network 202, the control unit 120 could communicate with a separate control unit associated with the safe 102. That is, the control unit 120 could communicate with another control unit which would interface directly with the electronic lock 104, such as shown in the electronic locking system 100 of FIG. 1. Similarly, while only one control unit 120 is shown, a plurality of control units could access a plurality of safes 102 according to the present invention.

Figure 3:
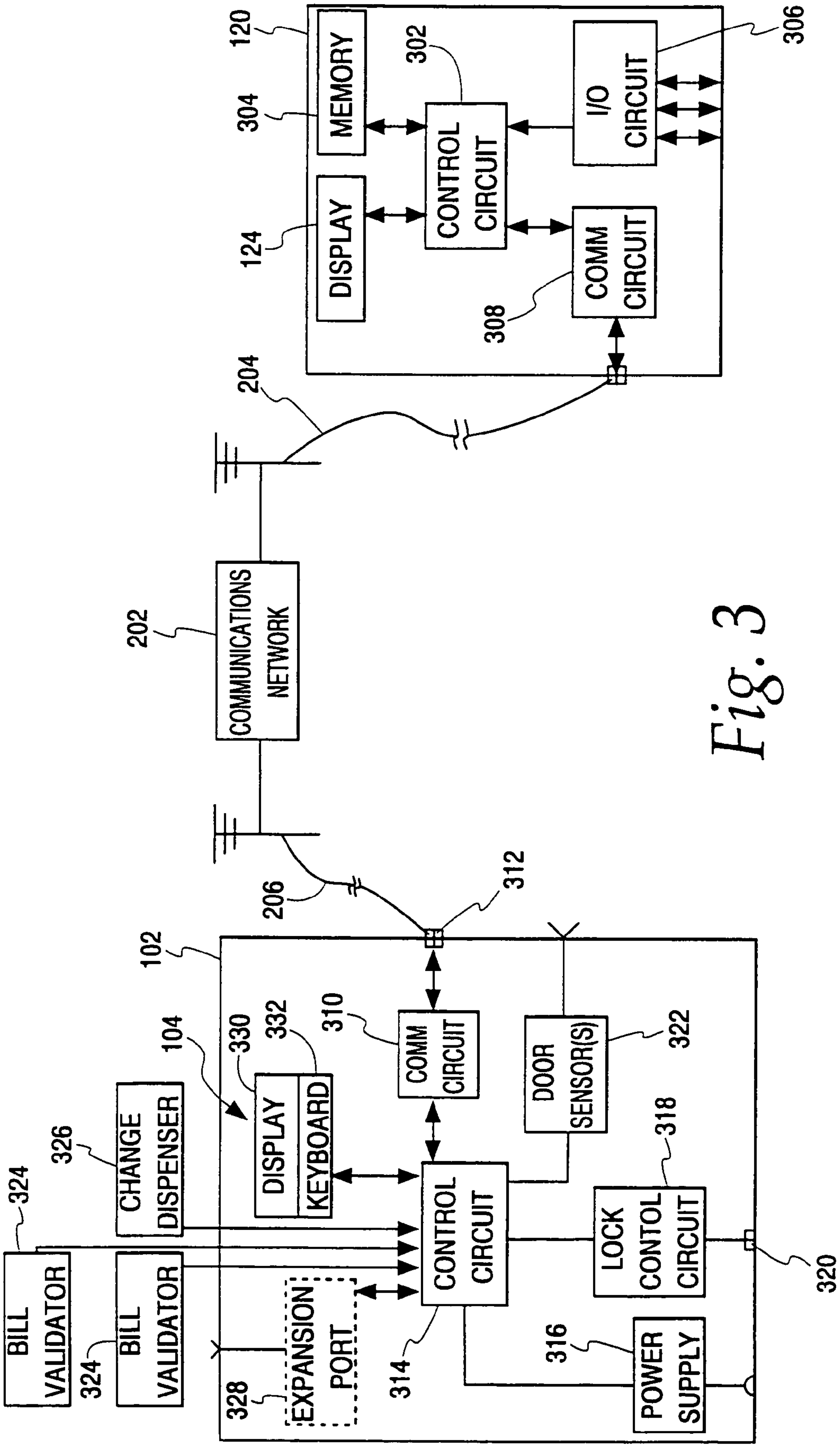
FIG. 3 is a block diagram of a safe having an electronic lock coupled to a control unit by way of a telecommunications network according to the present invention.

Turning now to FIG. 3, a block diagram shows elements of the control unit 120 and the electronic lock 104 according to the present invention. In particular, the control unit 120 includes a control circuit 302 which is coupled to a memory 304 for storing information received from the electronic lock 104. The control unit 302 could be any microcontroller, microprocessor, or a custom integrated circuit, or a computer device incorporating such a device. The control unit 120 further comprises an input/output circuit 306 for receiving information from a keyboard or outputting data to a printer, for example. The control unit 120 preferably includes a communication circuit 308 for communicating with a communications network 202. The communication circuit 308 could be any device, such as a modem or ASIC for data communication, enabling the communication of data between the control unit 120 and the electronic lock 104, locally, or over a telecommunications network.

The electronic lock 104 also comprises a communication circuit 310 coupled to an input/output port 312 for enabling a control circuit 314 to communicate with the control unit 120. A power supply 316, such as an AC power supply, is coupled to power the control circuit 314. The electronic lock 104 also includes a lock control circuit 318 coupled to control a lock 320. Door sensors 322 are also coupled to the control circuit to provide information regarding the state of the door. The safe 102 preferably includes bill validators 324 and a change dispenser 326 to process currency. Finally, an expansion port 328 is coupled to the control circuit 314 to enable the use of additional peripheral devices, such as a password keyboard, an infrared key, or other hardware. The electronic lock 104 could optionally include a display 330 and a key pad 332 on the outside of the safe. Although the control unit 120 is coupled to an electronic lock 104 through communication network 202, the control unit 120 could be coupled directly to the electronic lock 104 or by a local wireless connection according to the present invention.

Figure 4:
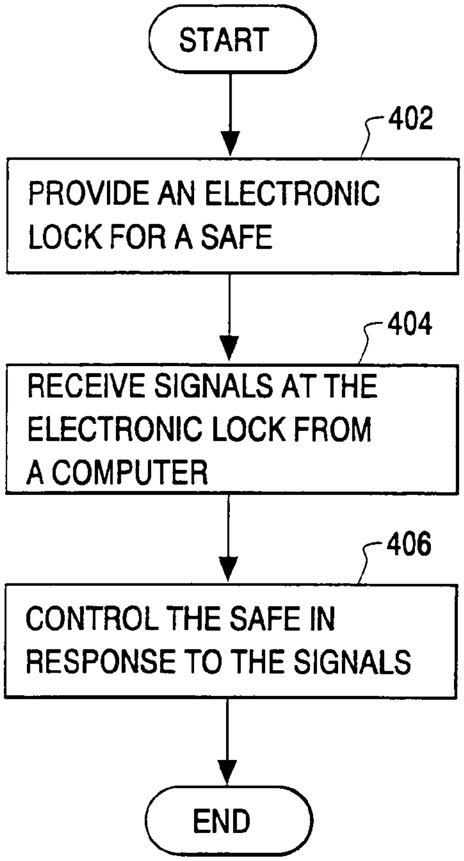
FIG. 4 is a flow chart showing a method for controlling a safe having an electronic lock according to the present invention.

Turning now to FIG. 4, a flow chart shows the method for controlling a safe having an electronic lock according to the present invention. The method of FIG. 4 shows the use of a control unit to provide signals to an electronic lock to control the electronic lock. In particular, an electronic lock is provided for a safe at a step 402. The electronic lock receives signals from a computer at a step 404. The signals could be any types of signals recognized by the electronic lock, such as lock or unlock signal, signals changing access parameters to the device, or any signals necessary to implement the functions described in reference to FIG. 10. The electronic lock then controls the safe in response to the signals at a step 406.

Figure 5:
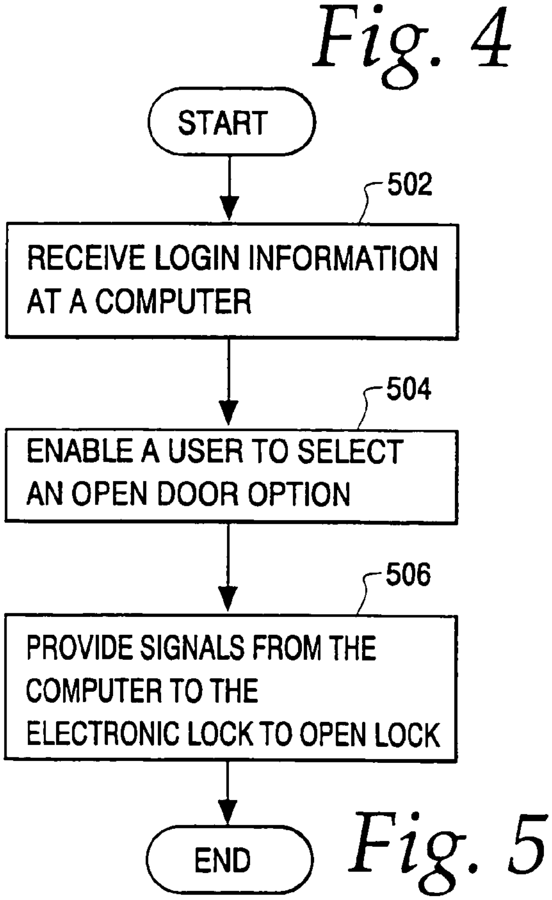
FIG. 5 is a flow chart showing a method for enabling access to a safe having an electronic lock by an authorized user according to an alternate embodiment of the present invention.

Turning now to FIG. 5, a flow chart shows a method for enabling access to a safe by way of an electronic lock according to the present invention. In particular, a control unit such as a computer receives login information from a user at a step 502. The computer enables the user to select an open door option at a step 504 after receiving valid login information. The computer then provides signals to the electronic lock, causing the electronic lock to open the lock of the safe at a step 506 to thereby change the lock from a closed state into an open state. Such signals from a control unit could be provided by way of a telecommunications network in FIG. 2, or locally as shown in FIG. 1.

Figure 6:
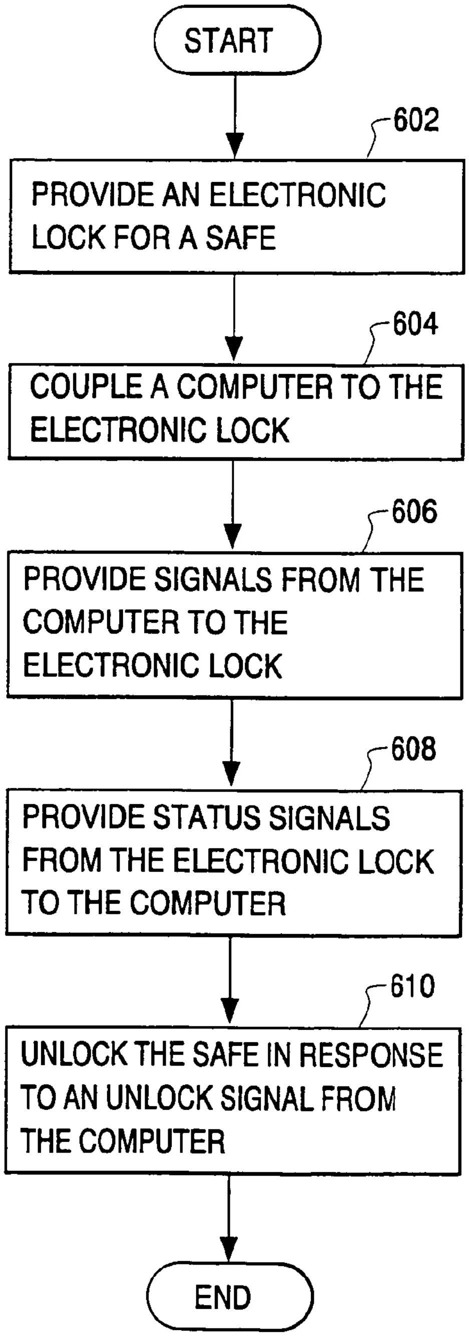
FIG. 6 is a flow chart showing a detailed method for controlling a safe having an electronic lock according to an alternate embodiment of the present invention.

Turning now to FIG. 6, a flow chart shows a method for controlling a safe having an electronic lock according to an alternate embodiment of the present invention. In particular, an electronic lock is provided for a safe at a step 602. The electronic lock is coupled to a control unit at a step 604. The coupling could be performed locally, or remotely by way of a wireline or wireless communications network. Similarly, the computer could be coupled to a plurality of safes having electronic locks. Signals are then provided from the computer to an electronic lock at a step 606. The signals could be any type of signals, including any signals necessary to implement features described in reference to FIG. 10 including currency processing and door control. Status signals could then be provided from the electronic lock to the computer at a step 608. Finally, the safe could be unlocked in response to an unlock signal from the computer at a step 610.

Figure 7:
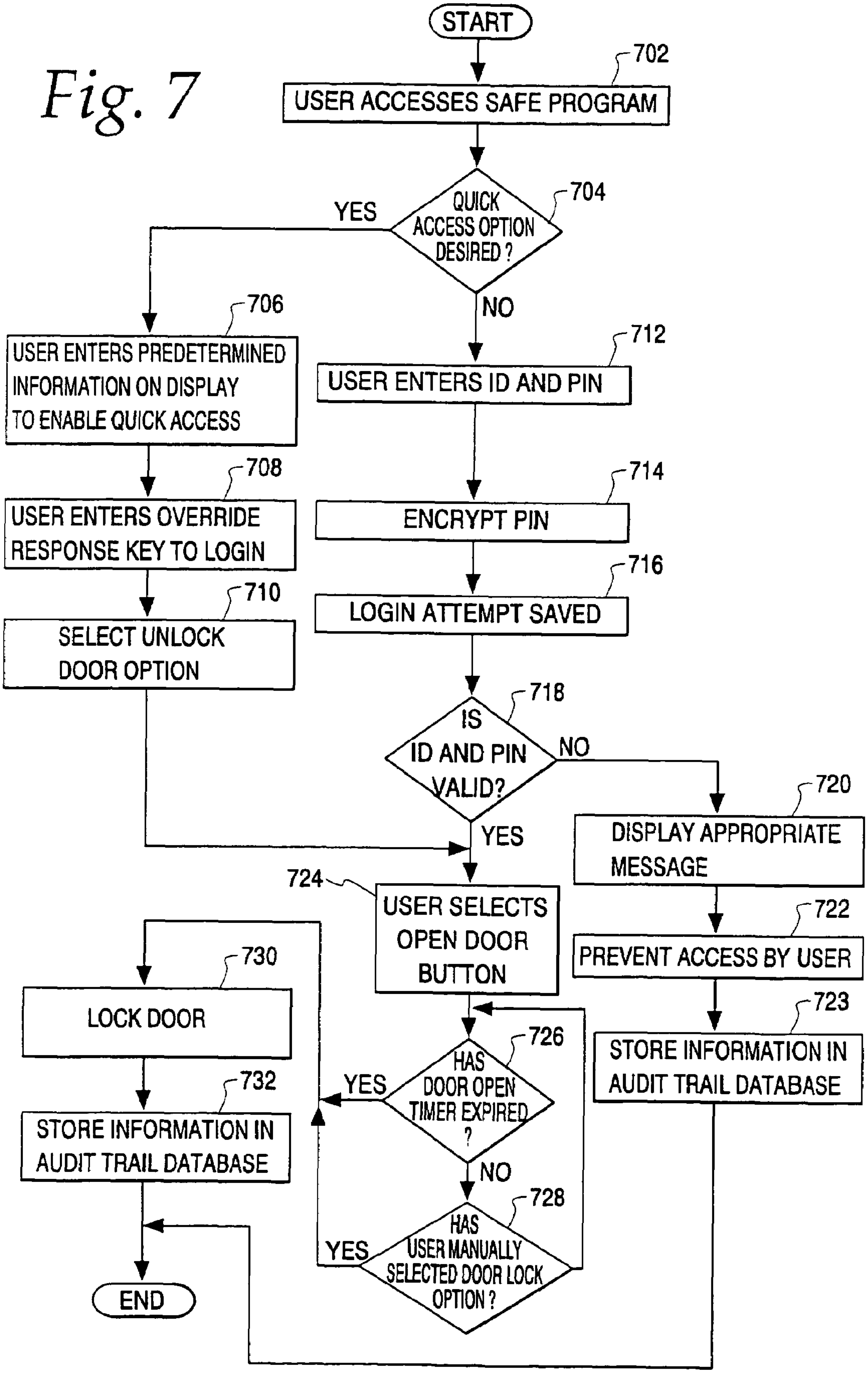
FIG. 7 is a flow chart showing a detailed method for controlling a safe having an electronic lock according to an alternate embodiment of the present invention.

Turning now to FIG. 7, a flow chart shows a more detailed operation of a method for controlling a safe according to the present invention. In particular, a user accesses a program at a step 702. The user has the option of selecting a "quick access" option at a step 704. Quick access may also be required if a user forgets or loses all available access information. If the user desires the quick access option, the user enters predetermined information on the display at a step 706. For example, the user could select a predetermined secret location on the display. Alternatively, a user could enter a default user ID, such as 9999. The user then enters an override response key to log in at a step 708. The override response key could be a known number or a number which must be derived, such as a 25 digit alphanumeric number which could be decrypted by a lock manufacturer or service center to provide an unlock code to be entered by the user. The user then enters a back door key at a step 710.

If the user is not privy to or does not desire to use the quick access option, the user enters a conventional identification (ID) and personal identification number (PIN) at a step 712. The PIN is then preferably encrypted at a step 714. The encryption is beneficial in preventing any undesired discovery of the password if the electronic lock is tampered with or accessed by an unauthorized user. The login attempt is then saved to a database at a step 716. Preferably, all login attempts are recorded in an audit trail data base stored within the computer or some other location.

It is then determined whether the ID and PIN are valid at a step 718. If the PIN is not valid, an appropriate message is displayed to the user at a step 720. Access to the user is then prevented at a step 722. Information related to the login attempt and the denial of access are then stored in the audit trail database at a step 723. If the user ID and PIN are valid, the user selects a door open option button at a step 724. It is then determined whether a door open timer has expired at a step 726. If the door open timer has not expired, it is then determined whether the user has manually selected a door lock option at a step 728. If the door open timer has expired or the user has manually selected the door lock option, the door is then locked at a step 730. Finally, any information related to the opening and closing of the safe by the user is stored in the audit trail database at a step 732.

Figure 8:
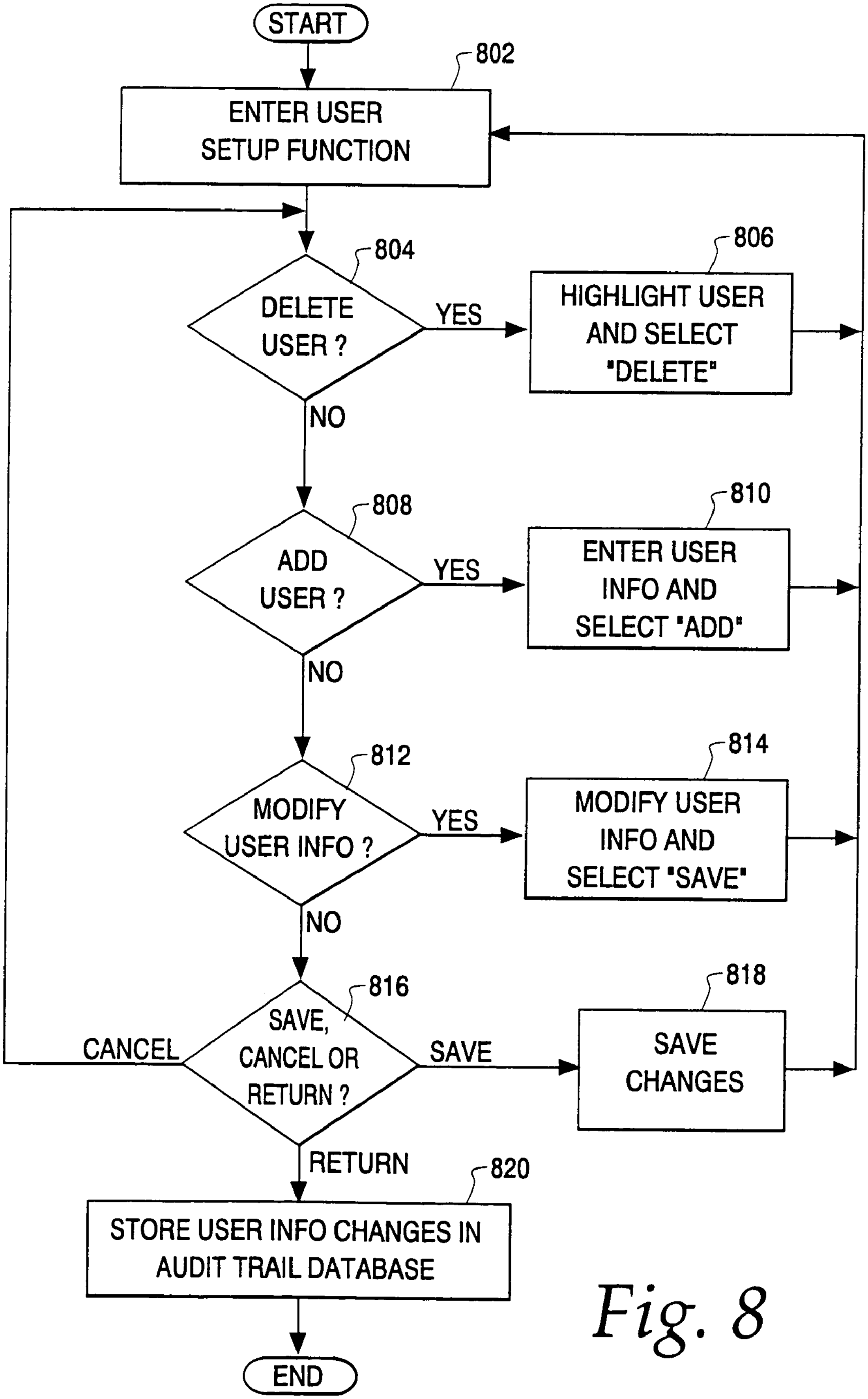
FIG. 8 is a flow chart showing a method for setting up authorized users of an electronic lock according to the present invention.

Turning now to FIG. 8, a method for performing a set up function according to the present invention is shown. In particular, a user enters a set up function at a step 802. The user must preferably be an authorized user to enter the set up function. It is then determined whether it is desired to delete a user at a step 804. If a user is to be deleted, the user is highlighted and a delete button is selected at a step 806. It is then determined whether a user is desired to be added at a step 808. If so, information related to the user is entered and an "add" button is selected at a step 810. It is also determined if user information is desired to be modified at a step 812. If so, the user information is modified and a "save" button is selected at a step 814. Finally, it is then determined whether the user desires to save, cancel or return to the main menu at a step 816. If the user desires to save changes, the changes are saved at a step 818. A user can then make additional changes, or elect to return to the main menu. Alternatively, a user can cancel any changes made after a save is performed, and revert to the previously saved information. Finally, the user information that is saved when a user desires to return to the main menu is stored in an audit trail data base at a step 820.

Figure 9:
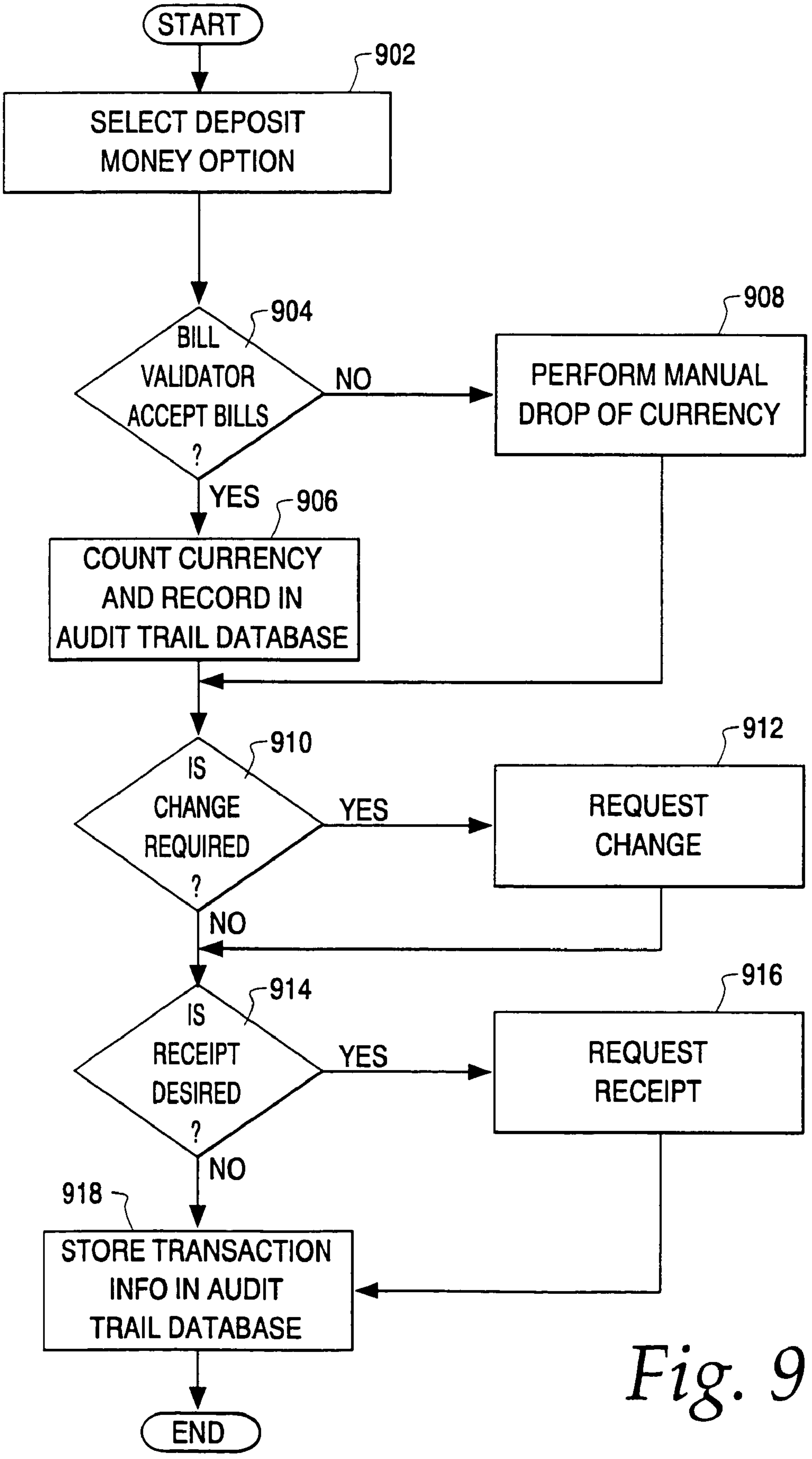
FIG. 9 is a flow chart showing a method for depositing money in a safe having an electronic lock according to the present invention.

Turning now to FIG. 9, a method for using a bill validator and change dispenser is shown. A deposit money option is selected, activating a bill validator. If the bill validator accepts bills at a step 904, the inserted bills are counted and recorded in an audit trail database at a step 908. However, if the bill validator does not accept or is unable to detect the bill, bills can then be inserted manually into a manual drop at a step 908. When bills are inserted into the manual drop, the amount which is inserted is entered into the database by way of a control unit, such as a computer, coupled to the electronic lock. It is then determined whether a change is desired at a step 910. If change is desired, a user requests the coins that are desired at a step 912, and inserts the bills to receive the coins. It is then determined if a receipt is desired at a step 914. If a receipt is desired, a receipt is requested at a step 916. Finally, the transaction information is then stored in the audit trail database at a step 918.

Figure 10:
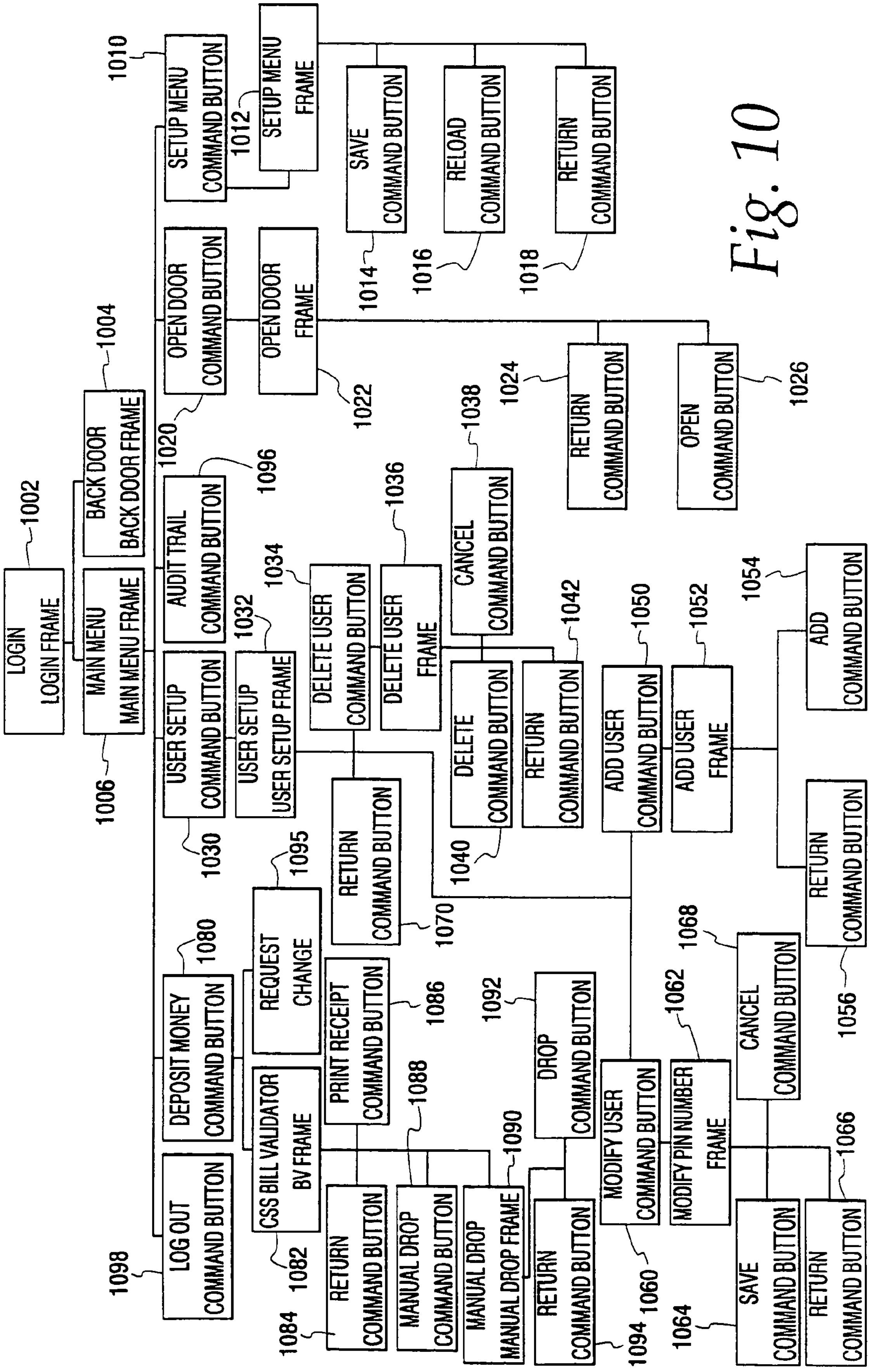
FIG. 10 is a tree diagram showing the functionality of software for controlling a safe having an electronic lock according to the present invention.

Turning now to FIG. 10, a tree diagram shows the functions of software adapted to perform the methods of the present invention. Such functions could be implemented in software running on any operating system, such as a Windows based system. In particular, a LOGIN Frame 1002 is accessible by selecting the program incorporating the methods of the present invention. For example, the program could be selected on control unit 120 as shown in FIGS. 1 and 2. The LOGIN Frame generally includes areas for receiving login information, such as a user ID and a personal information number (PIN). A user could optionally select a BACK DOOR Frame 1004, which would enable a user to more quickly login. For example, by selecting a secret location on the frame or entering an override response key, the user could gain access to the MAIN MENU Frame 1006.

When the MAIN MENU Frame is reached, a number of command buttons are shown. For example, a SET UP MENU Button 1010 enables a user to select a SET UP MENU Frame 1012. The SET UP MENU Frame 1012 preferably includes an option to select a variety of functions performed by the software. For example, a user could specify the communications port, the number of doors controlled by the electronic lock, the types of bill accepted, the use of sound, the number of work shifts, or e-mail addresses for notification. Within the SET UP MENU Frame 1012 are a SAVE Command Button 1014 to allow a user to save the selected set of features, a RELOAD Command Button 1016 to allow a user to return to previous settings, and a RETURN Command Button 1018 to return to the main menu, for example, after saving new set up options.

An OPEN DOOR Command Button 1020 is also present on the MAIN MENU Frame 1006. The OPEN DOOR Command Button 1020, when selected, accesses an OPEN DOOR Frame 1022. The OPEN DOOR Frame 1022 includes a RETURN Command Button 1024 and an OPEN Command Button 1026. The OPEN Command Button 1026 generally enables a user to open the safe door by way of the electronic lock. Such a selection of an OPEN Command Button is preferably saved in an audit trail database, as will be described in more detail in reference to FIG. 11.

The MAIN MENU Frame also includes a USER SETUP Command Button 1030, which when selected, accesses a USER SETUP Frame 1032. When in the USER SETUP Frame 1032, a user can select a DELETE USER Command Button 1034. If selected, the DELETE USER Command Button 1034 leads to a DELETE USER Frame 1036 having a CANCEL Command Button 1038, a DELETE Command Button 1040, and a RETURN Command Button 1042. Accordingly, a particular user, when highlighted on the DELETE USER Frame 1036, can be deleted by selecting the DELETE Command Button 1040.

Similarly, a user can be added by selecting the ADD USER Command Button 1050 on the USER SET UP Frame 1032. When the ADD USER Command Button 1050 is selected, an ADD USER Frame 1052 is accessed. The user information for a new user is then added to the ADD USER Frame, and an ADD Command Button 1054 can then be selected. A RETURN Command Button 1056 can then be selected to return to the USER SET UP Frame.

Authorized users can also select a MODIFY USER Command Button 1060 to access a MODIFY PIN NUMBER Frame 1062. The MODIFY PIN NUMBER Frame allows an authorized user to change a PIN number for a user, and save the change by selecting a SAVE Command Button 1064. The user can cancel the change by selecting the CANCEL Command Button 1066 or return to the USER SETUP Frame 1032 by selecting a RETURN Command Button 1068. Finally, a RETURN Command Button 1070 is also included in the USER SETUP Frame 1032 to allow the user to return to the MAIN MENU Frame 1006.

A DEPOSIT MONEY Command Button 1080 is also displayed on the MAIN USER Frame 1006. When selected, a Bill Validator Frame 1082 is then displayed activating the bill validator and enabling a user to deposit money into the bill validator. The Bill Validator Frame 882 includes a RETURN Command Button 1084 and a PRINT RECEIPT Command Button 1086. A MANUAL DROP Command Button 1088 is also included to allow a user to manually deposit money within the safe, for example if the Bill Validator will not accept a particular bill. The MANUAL DROP Frame 1090, displayed when the MANUAL DROP Command Button 1088 is selected, allows a user access a drawer to perform manual drop of currency and enter the amount of currency deposited. The MANUAL DROP Frame 1090 also includes DROP Command Button 1092 and a RETURN Command Button 1094. A REQUEST CHANGE Button 1095 can be selected to enable a user to enter the desired coins to be returned and insert one or more bills into the bill validator to receive change for the bills without opening the safe.

Finally, an AUDIT TRAIL Command Button 1096 is included in the MAIN MENU Frame 1006 to allow a user to view an audit trail of transactions involved with the safe. The functions of the audit trail feature of the invention will be shown in more detail in reference to FIG. 11. Preferably, a LOG OUT Command Button 1098 is also provided on the MAIN MENU 1006 to allow a user to log out.

Figure 11:
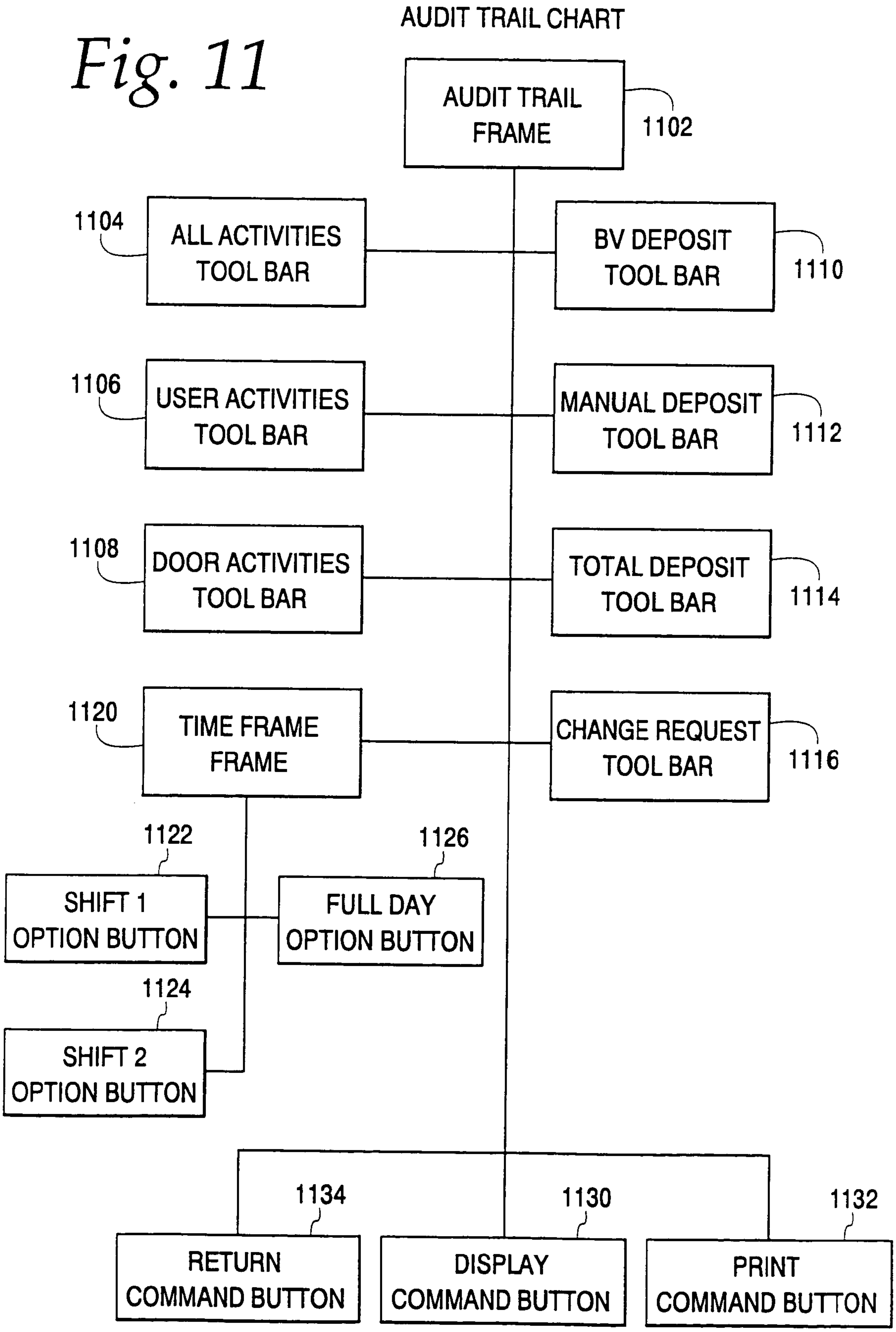
FIG. 11 is a tree diagram showing the functionality of an audit trail feature of FIG. 10.

Turning to FIG. 11, a tree diagram shows functions of the audit trail feature of the present invention. In particular, when the AUDIT TRAIL Command Button 1096 of FIG. 10 is selected, an AUDIT TRAIL Frame 1102 is displayed. A user can select one of a variety of tool bars to present predetermined information available through the audit trail. In particular, a user can select an ALL ACTIVITIES Tool Bar 1104 to view an audit trail of all the activities of the safe. The user could also select a USER ACTIVITIES Tool Bar 1106 to select a particular user and view activities of a particular user with the safe. A user could also select a DOOR ACTIVITIES Tool Bar 1108. A user could also select a BILL VALIDATOR DEPOSIT Tool Bar 1110 to view the deposits made by way of the BILL VALIDATOR. A user could also select a MANUAL DEPOSIT Tool Bar 1112 to view an AUDIT TRAIL of manual deposits. Finally, a user could select a TOTAL DEPOSIT Tool Bar 1114 to view all deposits recorded in the audit trail database. Finally, a CHANGE REQUEST Tool Bar 1116 enables a user to view an audit trail of all requests for change.

The AUDIT TRAIL Frame 1102 also includes a TIME FRAME Frame 1120 which allows a user to select a time during which audit trail records were recorded should be displayed. In particular, a user can select a SHIFT 1 Option Button 1122, a SHIFT 2 Option Button 1124, or a FULL DAY Option Button 1126. Finally, the AUDIT TRAIL Frame includes a DISPLAY Command Button 1130 to allow a user to display the selected information from the audit trail database, a PRINT Command Button 1132 to allow a user to print the displayed information from the audit trail database, or a RETURN Command Button 1134 to return to the AUDIT TRAIL frame 1096. The audit trail database could be stored on the control unit 120, or in a memory of the control circuit 314 of the safe 102.

It can therefore be appreciated that a new and novel method and apparatus for monitoring a safe has been described. It will be appreciated by those skilled in the art that, given the teaching herein, numerous alternatives and equivalent will be seen to exist which incorporate the disclosed invention. As a result, the invention is not to be limited by the foregoing exemplary embodiments, but only by the following claims.

We claim:

1. An electronic safe locking system comprising:

a safe comprising a housing having a door for limiting access to an enclosed space in the housing, and an electronic lock in the housing through which a plurality of transactions can be performed, the electronic lock including a lock control circuit performing locking transactions for selectively locking or unlocking the door, a door sensor for sensing state of the door, a currency processing apparatus for performing currency processing transactions, and a safe control circuit operatively coupled to the lock control circuit, the currency processing apparatus and the door sensor, the safe control circuit commanding operation of the plurality of electronic lock transactions responsive to lock commands and monitoring said transactions and status of the door sensor to develop status information, and a communication circuit operatively coupled to the safe control circuit and comprising a communication port accessible externally of the enclosed space; and a control unit external to the enclosed space having a communication circuit for selectively communicating with the safe control circuit via the communication port, the control unit comprising a processor and memory operating in accordance with a control program to control and monitor transactions of the safe, including determining if a user is an authorized user and responsive thereto transmitting lock commands to the safe control circuit and receiving status information from the safe control circuit relating to operation of the electronic lock responsive to the lock commands.

2. The electronic safe locking system of claim 1, the control unit monitoring said transactions with said safe control circuit to allow a determination to be made through the control unit that a transaction has been performed.

3. The electronic safe locking system of claim 1 further comprising a display and keyboard on the safe providing a local interface to the safe control circuit.

4. The electronic safe locking system of claim 1 wherein the control program comprises a user setup program operable to modify authorized users of the safe.

5. The electronic safe locking system of claim 1 wherein said memory comprises a database having encrypted PIN information.

6. The electronic safe locking system of claim 1 wherein the memory stores monitored information received by the control unit in an audit trail database.

7. The electronic safe locking system of claim 1 wherein the control program comprises a currency processing program operable to control operation of the currency processing apparatus.

8. The electronic safe locking system of claim 1 wherein said control unit is located proximate the safe and the communication circuits communicate via a direct communication link.

9. The electronic safe locking system of claim 1 wherein said control unit is located remote from the safe and the communication circuits communicate via a communications network.

10. The electronic safe locking system of claim 1 wherein the communications circuits comprise modems.

11. An electronic safe locking system comprising:

a plurality of safes, each safe comprising a housing having a door for limiting access to an enclosed space in the housing, an electronic lock in the housing through which a plurality of transactions can be performed, the electronic lock including a lock control circuit performing locking transactions for selectively locking or unlocking the door, a door sensor for sensing state of the door, a currency processing apparatus for performing currency processing transactions, and a safe control circuit operatively coupled to the lock control circuit, the currency processing apparatus and the door sensor, the safe control circuit commanding operation of the plurality of electronic lock transactions responsive to lock commands and monitoring said transactions and status of the door sensor to develop status information, and a communication circuit operatively coupled to the safe control circuit and comprising a communication port accessible externally of the enclosed space; and a control unit having a communication circuit for selectively communicating with each of the plurality of safe control circuits via the communication ports, the control unit comprising a processor and memory operating in accordance with a control program to control and monitor transactions of the plurality of safes, including determining if a user is an authorized user and responsive thereto transmitting lock commands to one of said plurality of safe control circuits and receiving status information from the one of said plurality of safe control circuits relating to operation of the electronic lock responsive to the lock commands.

12. The electronic safe locking system of claim 11, the control unit monitoring said transactions with said safe control circuits to allow a determination to be made through the control unit that a transaction has been performed.

13. The electronic safe locking system of claim 11 wherein the control program comprises a user setup program operable to modify authorized users of the safe.

14. The electronic safe locking system of claim 11 wherein said memory comprises a database having encrypted PIN information.

15. The electronic safe locking system of claim 11 wherein the memory stores monitored information received by the control unit in an audit trail database.

16. The electronic safe locking system of claim 11 wherein the control program comprises a currency processing program operable to control operation of the currency processing apparatus.

17. The electronic safe locking system of claim 11 each said safe further comprising a display and keyboard on the safe providing a local interface to the safe's safe control circuit.

18. The electronic safe locking system of claim 11 wherein said control unit is located proximate the safe and the communication circuits communicate via a direct communication link.

19. The electronic safe locking system of claim 11 wherein said control unit is located remote from the safe and the communication circuits communicate via a communications network.

20. The electronic safe locking system of claim 11 wherein the communications circuits comprise modems.

* * * * *